(No Model.)
2 Sheets—Sheet 1.
A. SHAFFER.
GANG PLOW.
No. 299,022. Patented May 20, 1884.
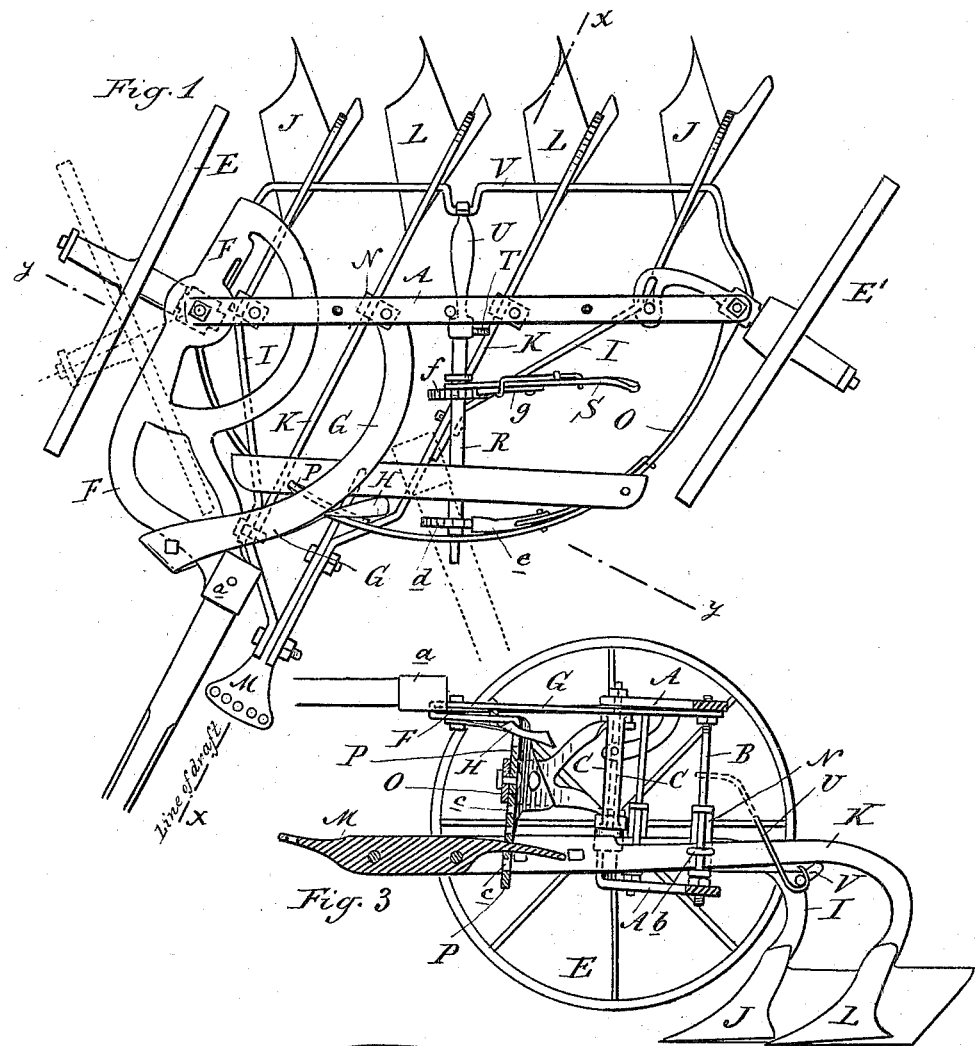
Attest:
A. Barthel
Inventor:
Abraham Shaffer
by his Atty Thos. S. Sprague

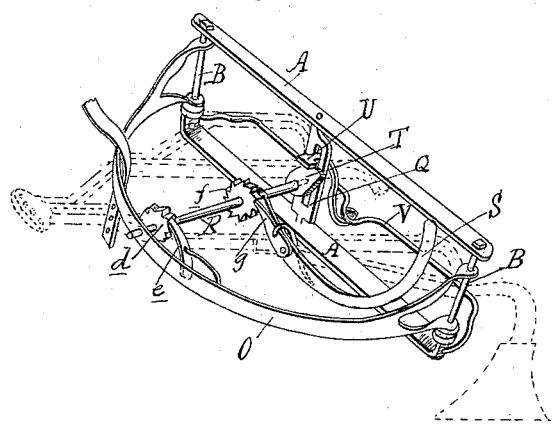

UNITED STATES PATENT OFFICE.

ABRAHAM SHAFFER, OF CASSOPOLIS, MICHIGAN.

GANG-PLOW.

SPECIFICATION forming part of Letters Patent No. 299,022, dated May 20, 1884.

Application filed August 1, 1883. (No model.)

*To all whom it may concern:*

Be it known that I, ABRAHAM SHAFFER, of Cassopolis, in the county of Cass and State of Michigan, have invented new and useful Improvements in Gang-Plows; and I do hereby declare that the following is a full, clear, and exact description thereof, reference being had to the accompanying drawings, which form a part of this specification.

This invention relates to certain new and useful improvements in gang-plows; and the novelty consists in the peculiar construction, arrangement, and combinations of the parts, all as more fully hereinafter described, and specifically pointed out in the claims.

Figure 1 is a top plan, with one wheel shown in dotted lines as adjusted for turning. Fig. 2 is an elevation of the frame in the plane $y\,y$. Fig. 3 is a section on line $x\,x$ in Fig. 1. Fig. 4 is a perspective view showing the arrangement of parts.

In the accompanying drawings, which form a part of this specification, A represents the frame of the machine, which is provided with the vertical rods B, situated at equal distances apart.

C C' represent brackets, each of which is provided with a stub-axle and arm, D, upon which the wheels E E' are mounted, such stub-axles projecting from the frame in such manner that the wheel E' upon the land side will be somewhat in the rear of the wheel E, thus making the frame A upon an oblique line, as shown, while the draft is applied upon a line parallel with the travel of the wheels, as more fully hereinafter described. As in all constructions of wheeled vehicles, it is preferable that the wheels should be arranged so as to have a slight "gather." The bracket C is loosely sleeved upon the vertical bar of its respective end of the frame A, and has rigidly secured to it a horizontal lever-frame, F, in the outer end of which is formed a socket, $a$, to receive the tongue, by means of which the direction of the machine is guided. This lever-frame projects through or beneath a bar, G, which projects forward from the frame A, and such bar is provided with a spring foot-latch, H, for the purpose of retaining the lever-frame F to its position and keeping the tongue in a direct line of draft while the device is in operation. When it is desired to turn the machine in the direction of the land side, or so that the wheel E' will act as the pivot in turning to the left, the operator presses his foot upon the spring foot-latch, which releases the frame F and allows the team to be turned to the left, and, by the connection herein named, compels the wheel E to assume a line at an angle and across the travel of the wheel E', when it will be found that the device can readily be turned so that the machine may be brought to operate upon a return travel or upon a line at right angles to the furrows last plowed. If it is desired to turn in the opposite direction, the wheel E is brought into precisely the same direction or position, and the machine is backed around to the position desired, care being taken in making either turn that the team be brought back into their original position, so that the pole will be in the direct line of draft of the machine. The bracket C', which carries the wheel E', is rigidly secured to its position after it has been adjusted, so that it will travel in a line parallel, or nearly so, to the travel of the wheel E.

I I represent the beams of the two outside plows, J J, the ends of such beams being adjustably secured to the beams K K of the intermediate plows, L. The forward ends of the beams K embrace and are secured to the inner or rear portion of an equalizing-clevis, M. Each of the plow-beams has secured to it a staple, $b$, which embraces its respective vertical rod B, and it is by means of these staples and the beams that the frame and wheels are drawn forward.

N are sliding brackets or yokes upon the vertical rods B, and which embrace the plow-beams, as shown.

The guide-bar G has its forward portion bent backward upon itself to embrace a portion of the lever-frame F, as seen in Fig. 3, and terminates in a vertical hanger, P, which being secured to the frame O, as seen in that figure, is provided with holes $c$, into which the rear end of the equalizing-clevis M is passed to adjust the forward ends of the beams K at will.

In the longitudinal center of the frame A there is secured a vertical bar, Q, in which one end of the shaft R is journaled, the opposite end of which is journaled in the curved bar O of the frame. This shaft carries near its front end a ratchet-wheel, d, with which engages a spring-pawl, e, which is pivotally secured to the bar O.

f is another ratchet-wheel secured upon the shaft R, with which engages a pawl, g, which is pivotally secured to the lever S, the lower end of which is loosely sleeved upon said shaft, while the opposite end projects upward within easy reach of the driver, who is seated upon a seat rising from the frame A. The rear or inner end of this shaft R has secured to it a cam, T, upon which rests one end of the bar U, which projects through the slot in the bar Q, the rear end of which bar U is hooked, as shown, and engages with the bail V, the ends of which are pivotally secured to the frame A; and it can readily be seen that by rotating the shaft R by means of the lever S and the connections herein last described the bail V may be elevated or depressed, so as to raise or lower the plows.

In gang-plows wherein the wheels travel at right angles to the shaft or axle, which extends entirely across the machine, the plows have necessarily to be set, in order to do effective work, at varying distances from such axle, and that they cannot simultaneously be raised or adjusted to or from the ground the same distance, but that each plow must be subject to its own adjustment. In my construction it will be seen that although the plows in operation are substantially similarly arranged—that is, one being back of the other—they are of the same distance from the frame A, which in my construction performs the function of an axle, and hence they can readily be simultaneously and uniformly raised or lowered, as circumstances may require. Again, it will be observed in my construction that the plow-beams converge toward a line parallel with the travel of the wheels, which enables me to have a direct front draft, and the plow-beams, all being connected, substantially, to the one clevis, with the outer ends of such beams, can readily be raised or depressed, as the circumstances of the work to be performed may require, so that at this point, in determining the pitch of one plow, I determine it for all. By having the wheels mounted substantially as described it can be seen that I am enabled to readily increase or decrease the angle of the frame A through the parts F G, in order that the work upon the team may be regulated as near as possible in accordance with the nature of the ground to be plowed.

What I claim as my invention is—

1. A gang-plow having a frame, as A, arranged obliquely to the line of travel, an adjustable land-wheel, E', and a series of plow-beams carrying plows arranged to correspond with the angle of said frame, in combination with lever-frame F, tongue-socket a, guide-bar G, and spring-latch H, as and for the purposes set forth.

2. In a gang-plow, and in combination with the frame A, stub-axles, and wheels, as described, the vertical rods B', the frame O, the beams K, having staples which embrace rods B, and having draft attachments M, and the frame F, having pole-socket a, as set forth.

3. In combination with the oblique frame A of a gang-plow, the plow-beams I I K K and plows J L, said plow-beams having staples and attached to an equalizing draft-clevis, M, common to all, said clevis being adapted to engage with a hanger, P, for determining the elevation of the outer ends of the plow-beams and the pitch of the plows and the sliding brackets embracing said beams, substantially as and for the purposes described.

4. In combination with a gang-plow constructed substantially as herein described, the shaft R, lever S, bail V, and bar U and cam T, adapted to raise and lower the plows, substantially as set forth.

5. In combination with the frame A of a sulky-plow, constructed substantially as described, the bracket C, stub-shaft D, wheel E, and lever-frame F, carrying pole-socket a, for adjusting the line of travel of such wheel, the bar G, and spring foot-catch H, substantially as and for the purposes described.

ABRAHAM SHAFFER.

Witnesses:
  H. S. SPRAGUE,
  CHARLES J. HUNT.